United States Patent [19]

Ito et al.

[11] 4,294,890
[45] Oct. 13, 1981

[54] METHOD FOR PREVENTING REFLECTION

[75] Inventors: Susumu Ito, Tokyo; Noboru Sugawara, Sagamihara; Sayoko Amano, Kawasaki, all of Japan

[73] Assignee: Canon Kabushiki Kaisha, Tokyo, Japan

[21] Appl. No.: 102,312

[22] Filed: Dec. 10, 1979

Related U.S. Application Data

[63] Continuation of Ser. No. 15,655, Feb. 27, 1979, abandoned, which is a continuation of Ser. No. 856,734, Dec. 1, 1977, abandoned, which is a continuation of Ser. No. 641,265, Dec. 16, 1975, abandoned.

[30] Foreign Application Priority Data

Dec. 23, 1974 [JP] Japan ............................ 49/147843

[51] Int. Cl.³ ............ B32B 15/20; B32B 15/04; C23C 13/02; C23C 13/04
[52] U.S. Cl. .................... 428/641; 428/631; 428/651; 428/666
[58] Field of Search ............ 428/630, 631, 641, 651, 428/666

[56] References Cited

U.S. PATENT DOCUMENTS 3,560,954  2/1971  Wolff et al. ..................... 346/135

OTHER PUBLICATIONS

Dept. of Defense Military Handbook 141, pp. 21-41 through 21-49, Oct. 1962.

*Primary Examiner*—James R. Hoffman
*Attorney, Agent, or Firm*—Fitzpatrick, Cella, Harper & Scinto

[57] ABSTRACT

This invention provides a method for preventing reflection. For this purpose and for decreasing the reflecting power of the surface of a light absorbing body of a metal or semi-metal material, the light absorbing body is covered by a light absorbing material of the simple substance of a metal or semi-metal.

7 Claims, 13 Drawing Figures

Aℓ + Si
RELATION BETWEEN FILM THICKNESS OF Si AND REFLECTING POWER.

Ag + Ge
RELATION BETWEEN FILM THICKNESS
OF Ge AND REFLECTING POWER.

Bi + Si
RELATION BETWEEN FILM THICKNESS OF Si AND REFLECTING POWER.

Bi + Cr
RELATION BETWEEN FILM THICKNESS OF Cr AND REFLECTING POWER.

Cr + Si
RELATION BETWEEN FILM THICKNESS
OF Si AND REFLECTING POWER.

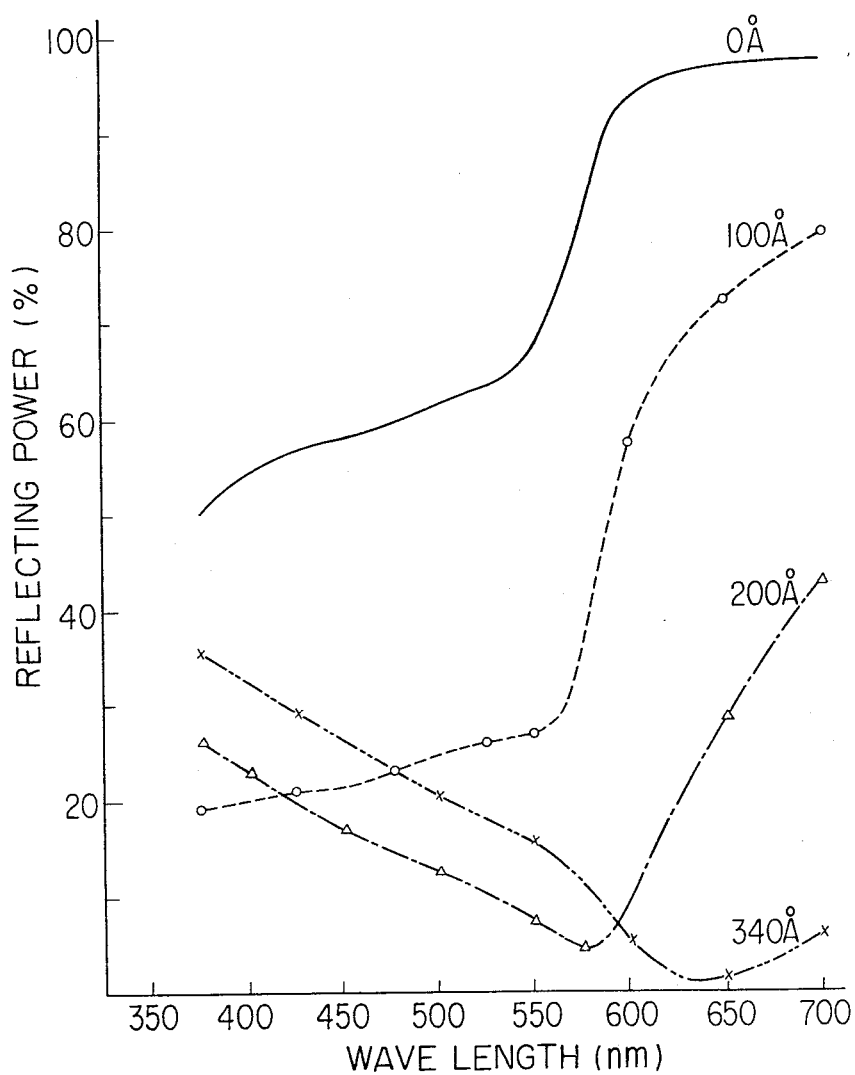

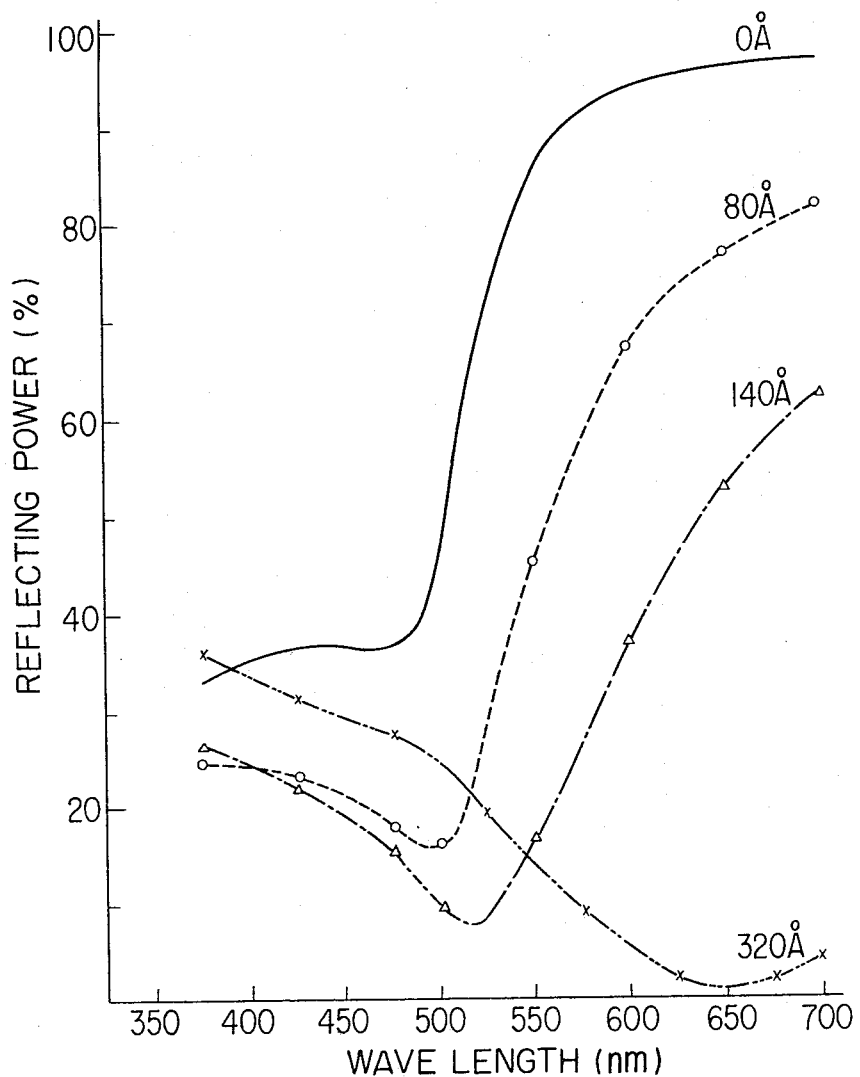

METHOD FOR PREVENTING REFLECTION

This is a continuation of application Ser. No. 15,655, filed Feb. 27, 1979 (now abandoned) which is a continuation of U.S. Ser. No. 856,734, filed Dec. 1, 1977 (now abandoned) which is a continuation of U.S. Ser. No. 641,265 filed Dec. 16, 1975 (now abandoned).

BACKGROUND OF THE INVENTION

1. Field of the Invention

This invention relates to a method for preventing the reflection of the surface at a metal or semi-metal of a light absorbing body.

2. Description of the Prior Art

Recently, there has been significant progress in photoetching techniques for making electronic parts of integrated circuits or conversion elements for converting optical energy into other energy or in the technology of working a thin film by a visible or infrared laser device. Consequently, it has been required to control the reflecting light at the surface of a body which absorbs a light (hereinafter called a light absorbing body).

In general, the surface reflecting power of a metal or semi-metal having a light absorbing property in the visible light region is as follows: Silver 94–98%, Al 88–91%, Au 35–98%, Cr about 50%, Bi 40–60%, Ge 40–60%, Si about 40%, and Cu 50–97% which show significantly high reflecting power.

In making the parts of an optical device or energy conversion elements using metal or semi-metal as a material thereof, since the light reflecting powers of these materials are high, it is difficult to effectively utilize the energy of the incident light because light reflection badly effects the properties of the device or elements.

It has been proposed to coat the surface of a light absorbing body with a dielectric substance which does not absorb the light so as to prevent light reflection. One of such methods is shown in "Vacuum Deposition of Thin Films" by L. Holland published by John Wiley & Sons, 1958, in which is reported coating a film of $MgF_2$, which is a dielectric, with a thickness of one fourth of the wavelength on the surface of a light absorbing film of the mixture of $Fe_2O_3$ and $CaSiO_3$. The other method is shown for example in "Non-metal absorbing film and reflection-prevention" by Katsube, published in Applied Physics 1968 37, Pages 225–230, in which on the light absorbing film of $Cr_2O_3$, two dielectric layers of $CeO_2$ and $MgF_2$, respectively, are coated for preventing the reflection of light. Further, a method is shown in U.S. Pat. No. 3,560,994 in which the surface of a metal is coated by a dielectric film so as to decrease the reflection of light at the surface of the metal. In this patent, the surface of Bi(bismuth) having complex refractive index $n-ik=2.07-3.93i$ is covered by a dielectric film having refractive index $n \cong 4$, so as to decrease the reflecting power of the surface of the Bi film. As for the material having the refractive index of about $n \cong 4$, $Si(n=4.5)$ and $Ge(n=4.4)$ have been indicated as suitable. Further, when visible red is assumed as a reflection-preventing region, it was suggested that Ge is a suitable material for covering the bismuth surface. According to a kind of vapor-deposition method for vapor depositing Ge on the base plate of bismuth, it is possible to make Ge as an absorbing material in the visible red region. However, in this U.S. Pat. No. 3,560,994 only dielectric substances have been considered as the material for deposition on the base plate, and consequently no consideration has been given to imaginary number k of the refractive index of a material to be vapor deposited. Moreover, in a reactive vapor deposition method in which the deposition is made in a vessel in which an active gas such as oxygen or sulphur has been introduced, vapor deposited Ge has a property of a dielectric material in the visible red wave length region. Therefore, from this patent it should be considered that the surface of a metal is covered only with a dielectric material for preventing light reflection at the metal surface.

However, in the above mentioned reflection-preventing method, the surface of a light absorbing body is covered by a dielectric film, in which the imaginary number $K=0$ in the complex refractive index $n-ik$, so that the conductivity and thermal conductivity of the surface of the light absorbing body are deteriorated and there is difficulty in subjecting it for the photo-etching process.

For overcoming said defect, it is preferable to cover the surface of a light absorbing body with the film of a second light absorbing body having the same property as that of the base light absorbing body for preventing reflection. However in using such light absorbing body as the reflection-preventing film the following two conditions must be considered in comparison to the case in which a dielectric body is used for the purpose of preventing the reflection.

One condition is that the imaginary number k in the complex refractive index $n-ik$ of the reflection-preventing film can not be neglected as the film is of a light absorbing body. In the complex refractive index, real number n represents the deviation of the phase of the incident light and the imaginary number k represents the attenuation of the amplitude of the incident light and it is called an attenuation number. Therefore, when a material having a large attenuation number is used for the reflection-preventing substance, the amplitude of the light reflected at the interface between the base plate and the reflection-preventing film and passing out from the film shall be significantly attenuated.

The second condition is that since both the reflection-preventing film and the base plate are of light absorbing bodies, respectively, the real numbers and the imaginary numbers of the complex refractive indices of both bodies, respectively, contribute to the fresnel reflection at the interface of both bodies.

Recently, the use of a light absorbing body for preventing reflection has been reported. One report is shown in "The condition for reflection-preventing method of precious metal thin film" by Mizuhashi et. al., 1971, Preminary presention of the 18th Applied Physics of Allied Science Lecture Meeting. This method is to provide a film of a suitable thickness having a slight absorbing property on the surface of a silver film. However, the complex refractive index of the metal used therein shows an attenuation number less than 0.1 and when calculating the condition of the reflection-prevention, the attenuation number is assumed to be zero, so that the metal is treated as a dielectric body. In fact, when the attenuation number is less than 0.1, the substance has the property of a dielectric rather than light absorbing body, so that there is no advantage of using a light absorbing body. Furthermore, in the existing metals there is no metal which has the imaginary number k of the complex refractive power less than 0.1.

In "Prevention of reflection by a metal film" by Sawaki, Investigation of reflection-preventing film, Chapter 6, October, 1960, Osaka Industrial Laboratory, a method of using a metal film as the reflection-preventing film is described. In this article, the reflection-preventing film of a metal is provided on the base plate of glass which is a dielectric body, so as to prevent reflection at the surface of the glass base plate. In case the external medium of the light incident side is air, i.e. $n=1$, the metallic reflection-preventing film for descreasing the reflecting power on the base plate of the light coming from the medium should have values of significantly less than 1 for optical constants n and k, respectively. In reality, there is no metal having such optical constants. Moreover, when the incident light comes from the glass plate side, the thickness of a metal film for preventing the reflection of light on the surface of the glass base is 1/1000–1/100 of the wavelength of the incident light, the metal film becomes too thin if the wavelength to be used is within or close to the visible region and therefore it is not possible to obtain an uniform thin reflection-preventing film.

In these two articles, a light absorbing body is considered to be a reflection-preventing film, but in the former article, the attenuation number is neglected and in the latter article the solution of the reflection-preventing film is a metal which does not exist. And also there has been no consideration of using a thin film of a light abosrbing body to prevent the reflection at the surface of the base plate of a light absorbing body. This was caused by the fact that the conditional equation for the light-prevention becomes complex if the base plate is of a light absorbing body.

SUMMARY OF THE INVENTION

This invention has theoretically solved the conditional equations in using the reflection-preventing film of a light absorbing body taking attenuation number k into consideration so as to present a reflection-preventing film of a light absorbing body having a superior reflection-preventing property.

According to this invention, the surface of a light absorbing body of a metal or semi-metal constituting the base is covered by a thin film of a light absorbing body of the simple substance of a metal or semi-metal so as to prevent the reflection at the surface of the base light absorbing body. In the following explanation, the light absorbing body to be used for covering the base light absorbing body is called the "light absorbing material" to discriminate it from the light absorbing body constituting the base.

A further object of the invention is to provide a reflection-preventing film having a good conductivity and good conduction of heat.

Another object of the invention is to provide a reflection-preventing film having a good workability in etching and so on.

Another object of this invention is to provide a thin film of a wide reflection-preventing capacity in comparison to that providing a dielectric film on a light absorbing body.

In accordance with this invention, taking the complex refraction of said light absorbing material into consideration, it has been found that material having on attenuation number of more than 0.5 has the property of a light absorbing material to be used for a film for preventing the reflection. In other words, such material has the property of a metal provided with electric conduction and heat condition. The light absorbing material in this invention has the attenuation number k larger than 0.5 in the complex refractive index.

Furthermore, in considering the imaginary number, which represents the light absorbing term in the complex refractive index n-ik, the thickness of the reflection-preventing film should be less than 1000 Å, and in considering further the obtention of a uniform film thickness, the thickness of the film of the reflection-preventing film should be less than 70 Å.

BRIEF DESCRIPTION OF THE DRAWINGS

FIGS. 3 through 13 are graphs illustrating features of other embodiments of this invention, each figure showing the relation between the film thickness and the spectroscopic reflecting power.

DESCRIPTION OF THE PREFERRED EMBODIMENTS

Figure 1:
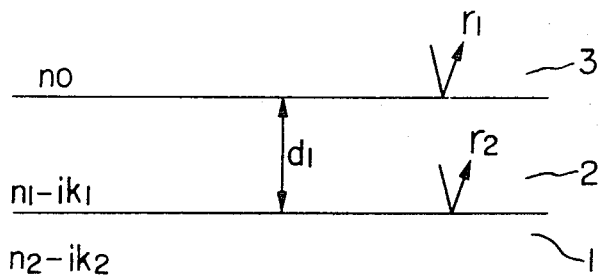
FIG. 1 is a diagram useful to explain the principle of this invention.

The theroretical analysis of this invention is firstly explained referring to FIG. 1, in which 1 is a base plate of a light absorbing body having the complex refractive index $n_2 - ik_2$, 2 is a thin film of light absorbing material having the complex refractive index $n_1 - ik_1$ to cover the base plate. The thickness of the thin film being $d_1$, 3 is an external medium having the refractive index $n_0$. The Fresnel coefficient at the interface between the external medium 3 and the thin film 2 of the light absorbing material is designated as $\vec{r_1}$ and the Fresnel coefficient at the interface between the thin film 2 of the light absorbing material and the light absorbing body base 1 is designated as $\vec{r_1}$.

$$\text{Then } \vec{r_1} = \frac{n_0 - n_1 + ik_1}{n_0 + n_1 - ik_1} = r_1 e^{i\Delta_1} \tag{1}$$

$$\vec{r_2} = \frac{(n_1 - ik_1) - (n_2 - ik_2)}{(n_1 - ik_1) + (n_2 - ik_2)} = r_2 e^{i\Delta_2} \tag{2}$$

where $$r_1 = \sqrt{\frac{(n_0 - n_1)^2 + k_1^2}{(n_0 + n_1)^2 + k_1^2}} \tag{3}$$

$$r_2 = \sqrt{\frac{(n_1 - n_2)^2 + (k_1 - k_2)^2}{(n_1 + n_2)^2 + (k_1 + k_2)^2}} \tag{4}$$

$$\Delta_1 = \text{Tan}^{-1} \frac{2n_0 k_1}{n_0^2 - n_1^2 - k_1^2} \tag{5}$$

$$\Delta_2 = \text{Tan}^{-1} \frac{2(n_1 k_2 - n_2 k_1)}{n_1^2 - n_2^2 + k_1^2 - k_2^2} \tag{6}$$

And $\delta$ which represents the phase variation $\delta_R$ and the amplitude attenuation $\delta_I$ within the thin film 2 of the reflection-preventing film of a light absorbing material is, when the incident light angle is perpendicular, $$\delta = \delta_R - \delta_I = \frac{4\pi(n_1 - ik_1)d_1}{\lambda} \quad (7)$$

where $\lambda$ shows the wavelength.

Consequently the complex amplitude reflecting power $\vec{r}$ considering $\delta$ and the phase of Fresnel coefficient $\vec{r_1}$ and $\vec{r_2}$, becomes $$\vec{r} = \frac{\vec{r_1} + \vec{r_2} \exp(-i\delta)}{1 + \vec{r_1} \cdot \vec{r_2} \exp(-i\delta)} \quad (8)$$

Therefore the energy reflecting power R which is the product of the reflecting power $\vec{r}$ and complex conjugate $\vec{r}$ is $$R = \vec{r} \cdot \vec{r} = \quad (9)$$
$$\frac{r_1^2 + 2r_1r_2 \cdot \exp(-\delta_I) \cdot \cos(\Delta_1 - \Delta_2 + \delta_R) + r_2^2 \exp(-2\delta_I)}{1 + 2r_1r_2 \cdot \exp(-\delta_I) \cdot \cos(\Delta_1 + \Delta_2 - \delta_R) + r_1^2 r_2^2 \exp(-2\delta_I)}$$

In the equation (9), the condition of $R=0$ is satisfied by making numerator of R to be 0 as the denominator of R is not 0. And therefore the condition for making 0 the reflecting energy at the wavelength 80 is $$r_1^2 + 2r_1r_2 \exp(-\delta_I) \cos(\Delta_1 - \Delta_2 + \delta_R) + r_2^2 \exp(-2\delta_I) = 0 \quad (10)$$

In equation (10)

$$r_1^2 + r_2^2 \exp(-2\delta_I) > 0 \quad (11)$$

$$2r_1r_2 \exp(-\delta_I) > 0 \quad (12)$$

and for making the equation 10 as 0

$$\cos(\Delta_1 - \Delta_2 + \delta_R) < 0 \quad (13)$$

consequently, from equation (13), $$\frac{\delta}{2} + 2m\pi < \Delta_1 - \Delta_2 + \delta_R < \frac{3}{2}\pi + 2m\pi \quad (14)$$

where m is a natural number including zero.

In considering equations (10), (11), (12) and (13)

$$r_1^2 + r_2^2 \exp(-2\delta_I) \leq 2r_1r_2\exp(-\delta_I)\{r_1 - r_2\exp(-\delta_I)\}^2 \leq 0 \quad (15)$$

For satisfying equation (15), the left terms should be equal to 0, and $$\cos(\Delta_1 - \Delta_2 + \delta_R) = -1 \quad (16)$$

is obtained, and consequently, for the amplitude condition, $$r_1 - r_2 \exp(-\delta_I) = 0$$

and for phase condition $$\Delta_1 - \Delta_2 + \delta_R = (2m+1) \quad (17)$$

where m is a natural number including zero.

This condition is expressed as follows by using equations (3), (4), (5) (6) and (7)

$$\sqrt{\frac{(n_0 - n_1)^2 + k_1^2}{(n_0 + n_1)^2 + k_1^2}} - \quad (19)$$

$$\sqrt{\frac{(n_1 - n_2)^2 + (k_1 - k_2)^2}{(n_1 + n_2)^2 + (k_1 + k_2)^2}} \exp\left(\frac{4xk_1d_1}{2}\right) = 0$$

$$\mathrm{Tan}^{-1}\left(\frac{2n_0k_1}{n_0^2 - n_1^2 - k_1^2}\right) -$$

$$\mathrm{Tan}^{-1}\left(\frac{2(n_1k_2 - n_2k_1)}{n_1^2 - n_2^2 + k_1^2 - k_2^2}\right) + \frac{4xn_1d_1}{2} = (2m+1)x$$

Equations (18) and (19) are simultaneous equations including five parameters of $n_1$, $k_1$, $n_2$, $K_2$ and $d_1$. Therefore if three parameters out of five parameters are arbitrarily given case-by-case, then the values of the remaining two parameters are obtained from equations (18) and (19).

For example, on the base plate of a light absorbing body having $n_2 = 0.15$ and $K_2 = 3.5$ in the complex refractive index n-ik, a thin film of $n_1 = 3.0$ is coated for preventing the reflection, and the refractive index $n_0 = 1$ of the external medium (air) and the wavelength 650 nm of the light are given, then from equations (18) and (19) $k_1 = 0.65$, $d_1 = 32.2$ nm are obtained.

These conditions accord with the case in which silicon is vacuum-deposited under certain conditions on the base plate of the vacuum-depositing gold having a thickness sufficiently thick to be opaque.

The values of the parameters obtainable from equations (18) and (19) do not always result in a combination of actually existing substances and rather they may be the combinations of nonexising substances. In view of this fact, we explain hereinafter the method for obtaining a most suitable thickness of the film for realizing a certain degree of reflection-preventing effect considering actually existing materials.

Assuming that the external medium is air, the incident light wavelength is $\lambda$, the complex refractive index of the base light absorbing body is $n_2$-$ik_2$, and the real number of the complex refractive index of a light absorbing material used for reflection-preventing film is $n_x$, then the imaginary number of the complex refractive index and the thickness of the reflection-preventing film are obtained from equations (18) and (19) as $k_x$ and $d_x$, respectivey. However, if there is no existing material having the complex refractive index $n_x$-$ik_x$ at the wavelength $\lambda$, then it is necesssary to find a material having values near said complex refractive index. In this case, this material must have, in addition to a complex refractive index close to $n_x$-$ik_x$, durability as the reflection-preventing film, good adhesivity with the base plate, the property of not chemically reacting with the substance of base plate and the property of not changing the physical property of the substance of the base plate. If there is a material which satisfies these conditions and the material has the refractive index of $n_y$-$ik_y$, and since the calculated value of $d_x$ obtained from $n_x$-$ik_x$ must be different from the value of thickness using a material having $n_y$-$ik_y$, the most suitable thickness should be recalculated. For this purpose there is a method of calculating by using a computer the variation of reflecting power R for the respective wavelengths $\lambda$ as making film thickness d as a parameter and putting $n_2$, $k_2$, $n_y$ and $k_y$ into equations (3), (4), (5), (6), (7) and (9). However, this method is time consuming and troublesome. Therefore, for seeking the method for obtaining simply a proper thickness of the film, we fix our eyes on equation (19), which gives a general solution for the proper thickness of the reflection-preventing film. This corresponds to putting $k_1=k_2=0$ into equation (19), where it corresponds to use a dielectric substance as reflection-preventing film to be coated on the base plate of a dielectric material, and equation (19) becomes $$n_1 d_1 = \lambda/4(2m+1) \quad (20)$$

This equation (20) is the equation to give the proper film thickness of the reflection-preventing film in the case of a dielectric material, equation (19) is said to give a general solution for determining the proper film thickness. And consequently, if $n_2$, $k_2$, $n_y$ and $k_y$ are substituted for equation (19), we considered that we could obtain a value near to the proper film thickness.

Using the above mentioned approximate method for calculation we obtained the following example with respect to the most suitable reflection-preventing film on the surface of Ag.

Figure 2:
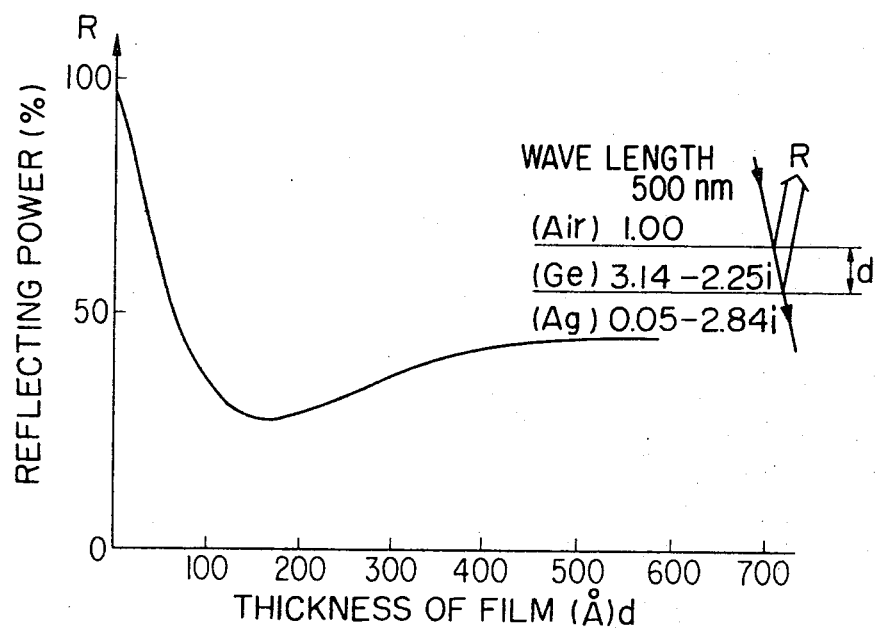
FIG. 2 is a graph showing the relation between the film thickness and the reflecting power of the reflection-preventing film of one embodiment of this invention.

The complex refractive index of Ag has as the wavelength 500 nm $n_2=0.05$ and $k_2=2.84$. The surface reflecting power is 98% when a light absorbing material having $n_1=3.14$ is used for the reflection-preventing film. The constants $k_1$ and thickness $d_1$ of the film are given as $k_1=0.72$, $d_1=2.05$ Å from equations (18) and (19). As a material having a value near to the complex refractive index 3.14-0.72i and providing the above described condition as reflection-preventing film is Ge $n_1=3.14$, $k_1=2.25$, and this Ge is used. FIG. 2 shows the most suitable thickness of Ge film calculated by a computer. FIG. 2 shows the state of reflecting power of Ag when the film thickness of Ge to be coated on the Ag at 500 nm wavelength of incident light, which is a light absorbing base. In ordinate, the reflecting power is shown, and in abscissa the film thickness is shown, the reflecting power being plotted at every 20 Å of the thickness. According to FIG. 2, the reflecting power of Ag becomes a minimum of 27% when the thickness of Ge is taken as about 170 Å. On the other hand, in equation (19), the optical constants of Ge, i.e. $n_1=3.14$, $k_1=2.25$ and of Ag, i.e. $n_2=0.05$, $k_2=2.84$ and wavelength $\lambda=500$ nm are substituted, the thickness of 190 Å of Ge film is obtained, which approximately coincides with the value calculated by the computer.

In the above example, a material having a complex refractive index close to the complex refractive index obtained by using equations (18) and (19) is searched, as the result of experiences, it is not possible to obtain a satisfactory reflection-prevention if a material does not satisfy:

$$0 < k/n < 1$$

when the refractive index of the material to be used is assumed to have n-ik.

Now we explain the actual examples in the following.

EXAMPLE 1

Figure 3:
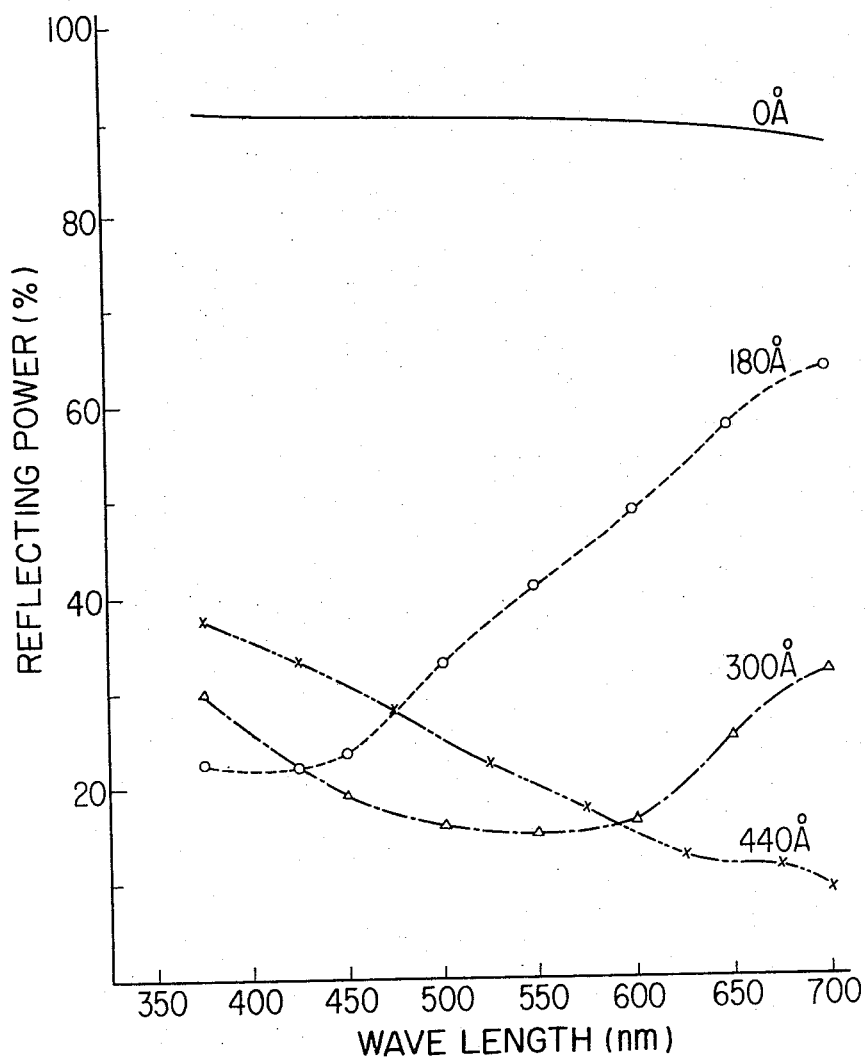

The surface of Al was covered by the thin film of Si so as to prevent the reflection at the surface of Al. Al was vacuum deposited at the pressure $p \leq 2 \times 10^{-5}$ Torr. to form a certain amount of thickness not to transmit the light, at which the reflecting power of the surface of Al reaches to about 87%-91% within the visible region. On this Al base, silicon was vapor deposited at the same pressure as above so as to decrease the reflection at the surface of Al. FIG. 3 shows the thickness of silicon film coated on the Al base versus spectroscopic reflecting power in the visible range, where the thickness of silicon was varied to be 0 Å, 180 Å, 300 Å and 440 Å, respectively. As is apparent from FIG. 3, by suitably selecting the thickness of the silicon film, it becomes possible to effectively prevent the reflection at a desired wavelength.

EXAMPLE 2

Figure 4:
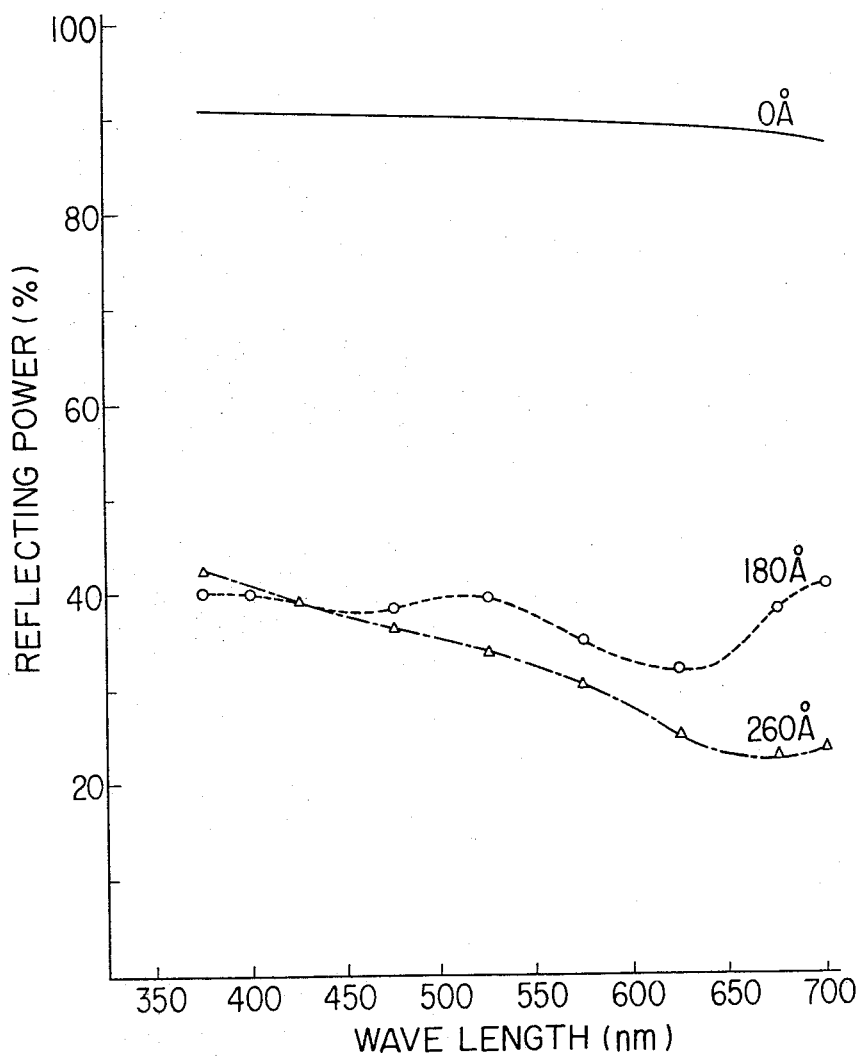

The surface of Al was covered by the thin film of Ge to prevent the reflection at the surface of the Al base. As in Example 1, Ge was vapor deposited on the surface of an Al base under the pressure of $p \leq 2 \times 10^{-5}$ Torr. so as to decrease the reflection. FIG. 4 shows the relation between the thickness of Ge film and the spectroscopic reflecting power in the visible region, the thickness of Ge film being changed to be 0 Å, 180 Å and 260 Å, respectively. According to this method, the reflection can be reduced to 178-¼.

EXAMPLE 3

Figure 5:
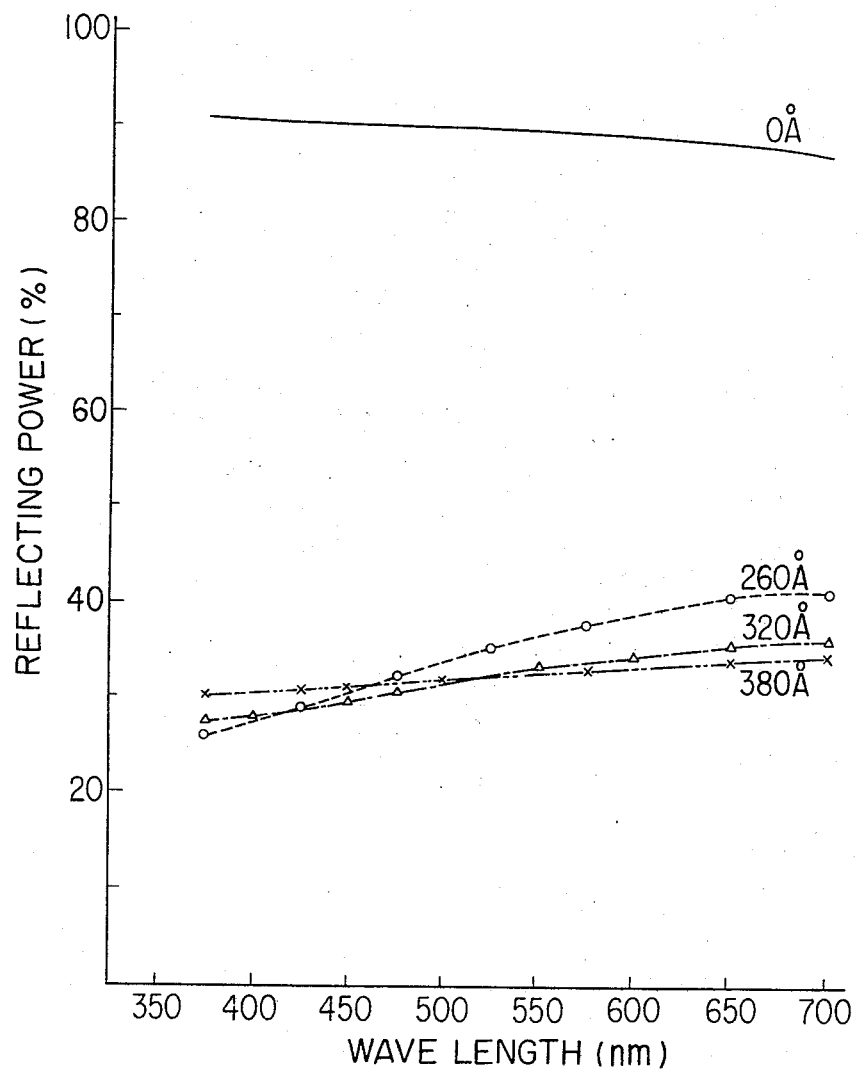

The surface of Al was covered by Cr thin film. On the surface of Al, Cr was vacuum deposited under the pressure $p \leq 2 \times 10^{-5}$ Torr. to reduce the reflection at the surface of Al base. FIG. 5 shows the relation between the film thickness and spectroscopic reflecting power, the film thickness being varied to be 0 Å, 260 Å, 320 Å and 380 Å. By this method the reflection at the surface of Al base was reduced ⅛.

EXAMPLE 4

Figure 6:
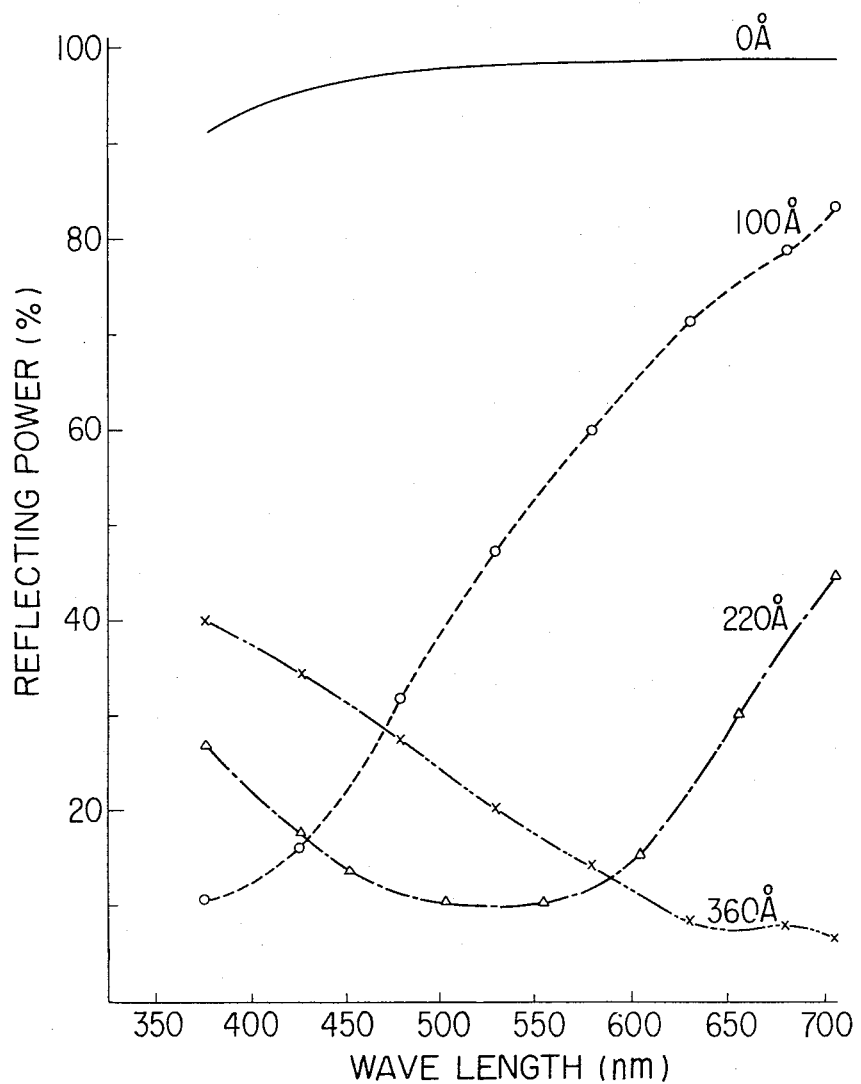

The surface of an Ag base was covered by the thin film of Si to prevent the reflection at the surface of Si base. Then Ag was vapor deposited under the pressure of $p \leq 2 \times 10^{-5}$ Torr. and the thickness of the film became sufficient to prevent transmission of the light. At this stage the surface reflecting power reaches to about 92-98% in the visible region. On the surface of Ag, silicon was vapor deposited under the pressure of $p \leq 2 \times 10^{-5}$ Torr. FIG. 6 shows the relation between the film thickness of Si and the spectroscopic reflecting power in the visible region, the thickness of Si film being varied to be 0 Å, 100 Å, 220 Å and 360 Å, respectively. It is apparent from FIG. 6, that suitably selecting the thickness of silicon film the reflecting power of the surface of Ag could be reduced to about 10%.

EXAMPLE 5

Figure 7:
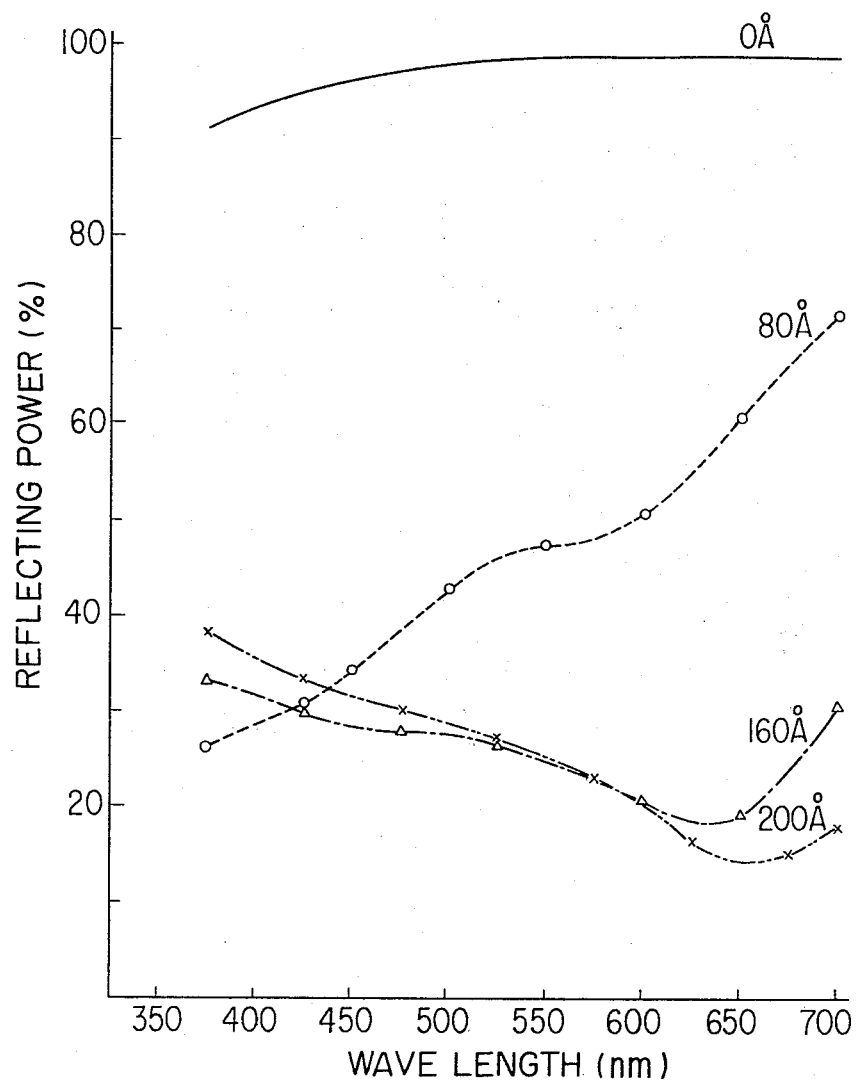

The surface of an Ag plate was covered by the thin film of Ge for preventing the reflection at the surface of the Ag plate. On the surface of vapor deposited Ag as in Example 4, Ge was vapor deposited under the pressure of $p \leq 2 \times 10^{-5}$ Torr. FIG. 7 shows the relation between the film thickness of Ge and the spectroscopic reflection of the surface of Ag base in the visible region, the thickness of Ge film being varied to 0 Å, 80 Å, 160 Å and 200 Å, respectively. According to this method the reflecting power was reduced to about 20%.

EXAMPLE 6

Figure 8:
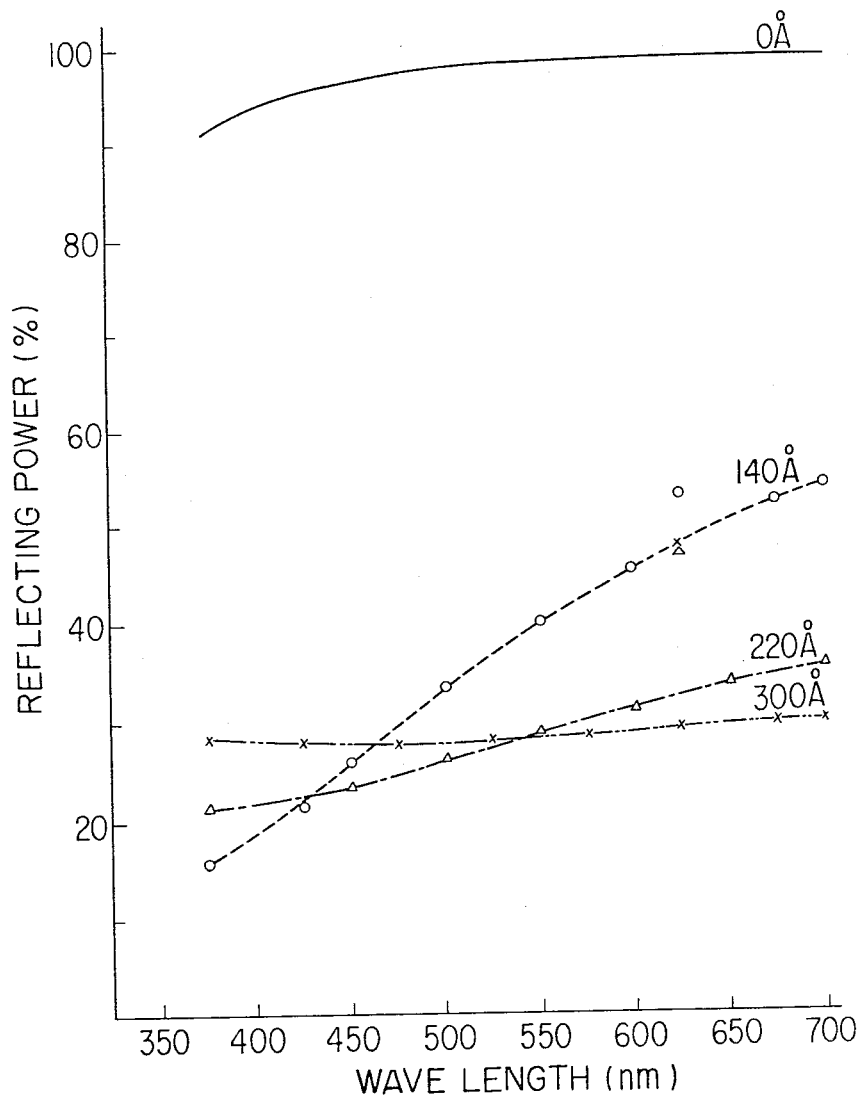

The surface of an Ag base plate was covered by a thin film of Cr to prevent the surface reflection. On the surface of Ag which has been deposited in the same way as in Example 4, Cr was vacuum deposited under the pressure of $p \leq 2 \times 10^{-5}$ Torr. FIG. 8 shows the relation between the film thickness and the spectroscopic reflecting power in the visible region, the thickness of the film being changed to be 0 Å, 140 Å, 220 Å and 300 Å. It is apparent from FIG. 8 that by using a Cr film of a suitable thickness, the surface reflecting power of Ag could be reduced to 30%.

EXAMPLE 7

Figure 9:
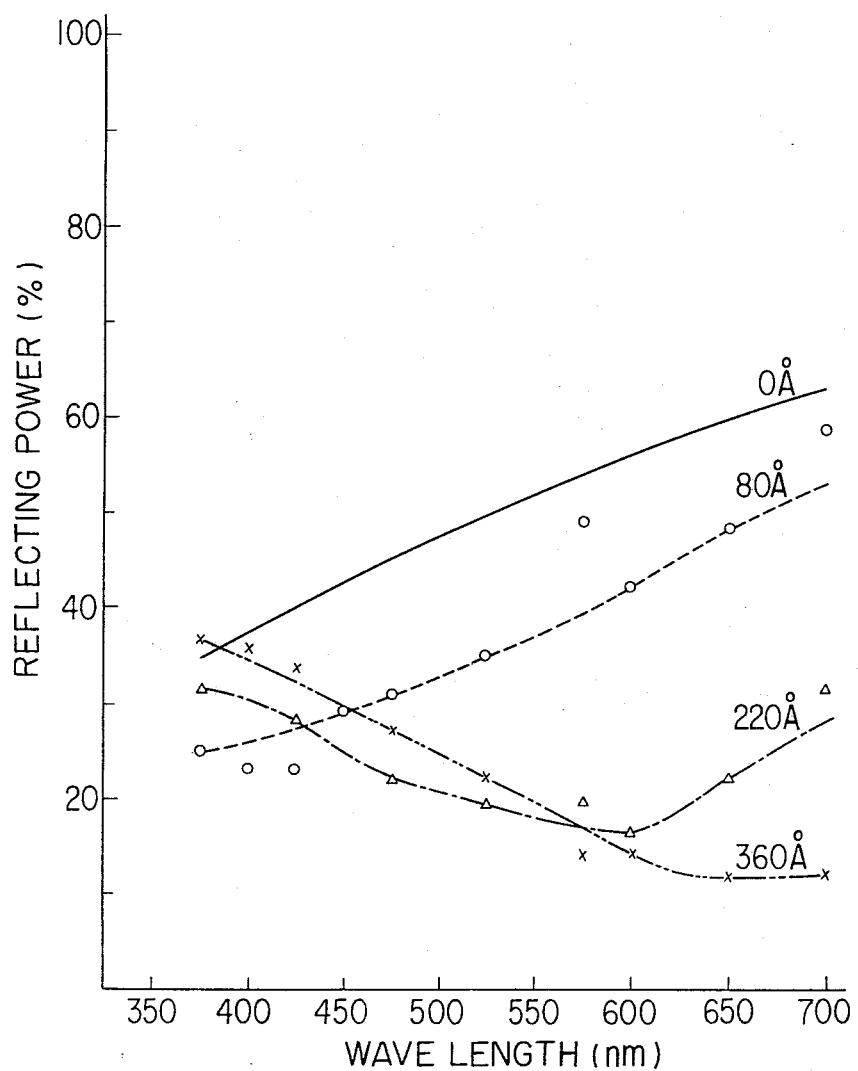

The surface of Bi was covered by a thin film of Si to prevent the reflection at the surface of Bi base. Bi was vapor deposited under the pressure $p \leq 2 \times 10^{-5}$ Torr. to form a certain amount of film thickness which does not transmit the light. Under this state the surface of the Bi plate has the reflecting power of about 35-60% in the visible region. On the surface of Bismuth base, silicon was vapor deposited under the pressure $p \leq 2 \times 10^{-5}$ Torr. so as to reduce the reflection on the surface of Bi base. FIG. 9 shows the relation between the thickness of Si film and the spectroscopic reflecting power in the visible region, the thickness of the film being varied to be 0 Å, 80 Å, 220 Å and 360 Å, respectively. According to this method, when the silicon film on the base is about 360 Å the reflecting power becomes about 10% at the wavelength $\lambda = 620$ nm-700 nm, which is about 1/6 of the original reflecting power.

EXAMPLE 8

Figure 10:
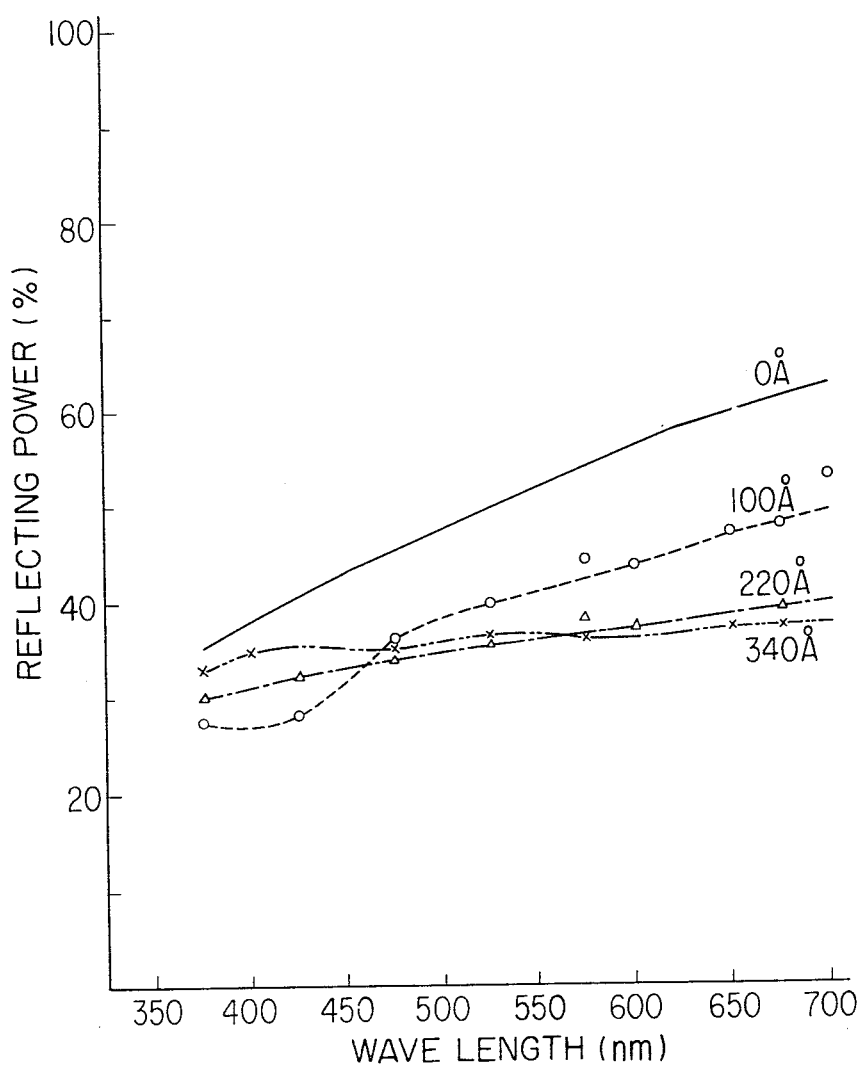

The surface of the Bi base was covered by a Cr thin film. On the surface of the Bi base which has been deposited in the same way as in Example 7, Cr was vacuum deposited under the pressure $p \leq 2 \times 10^{-5}$ Torr. for reducing the reflection at the surface of Bi base. FIG. 10 shows the relation between the film thickness of Cr and the spectroscopic reflecting power of the surface of Bi base in the visible region, the thickness of the film being varied to be 0 Å, 100 Å, 220 Å and 340 Å. According to this method, it is apparent that the reflection of the surface of Bi base could be reduced by selecting a suitable thick film of Cr.

EXAMPLE 9

Figure 11:
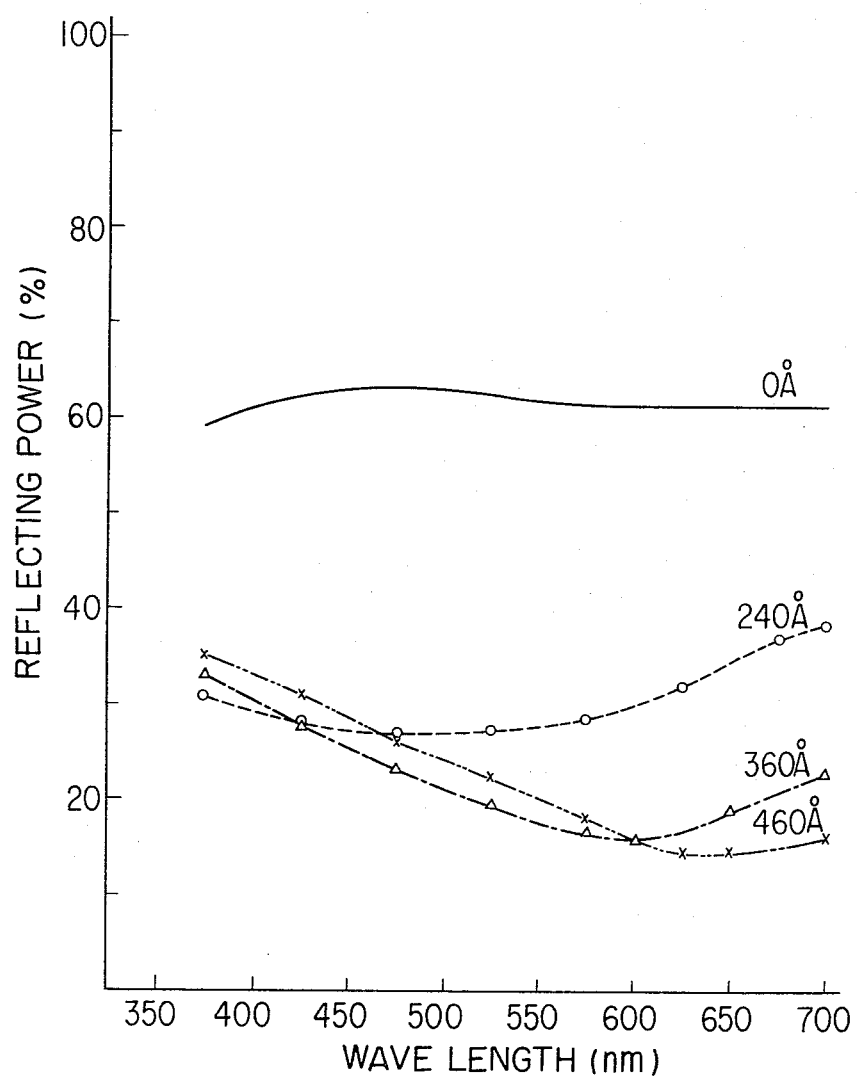

The surface of Cr was covered by a Si film. Cr was vacuum deposited under the pressure $p \leq 2 \times 10^{-5}$ Torr. to have a certain thickness which does not transmit the light, the reflecting power of which is about 60%. On the surface of Cr base, Si was vacuum deposited under the pressure of $p \leq 2 \times 10^{-5}$ Torr. for reducing the reflection on the surface of Cr base. FIG. 11 shows the relation between the thickness of Si film and the spectroscopic reflecting power in the visible region, the thickness being varied to have 0 Å, 240 Å, 360 Å and 460 Å, respectively. According to this method, the reflecting power could be reduced to $\frac{1}{2}$-$\frac{1}{4}$. For example, in the case of a thickness of Si film of 460 Å, the reflecting power becomes 15% at $\lambda = 630$ nm, which is about $\frac{1}{4}$ of the reflecting power of the Cr base having no Si film thereon.

EXAMPLE 10

The surface of a Cu base was covered by a thin film of Si for preventing the reflection of the Cu surface. After vacuum depositing Cu under the pressure $p \leq 2 \times 10^{-5}$ Torr. to have a certain thickness sufficient enough for not transmitting the light, it has the reflecting power of 50-97% in the visible region. On the surface of this Cu base, Si was vacuum deposited under the pressure of $p \leq 2 \times 10^5$ Torr. to have a suitable thickness. FIG. 12 shows the relation between the film thickness of Si and the spectroscopic reflecting power in the visible region, the thickness being varied to be 0 Å, 100 Å, 200 Å and 340 Å, respectively. By suitably selecting the film thickness of Si, the reflecting power of the Cu surface becomes about 0-20%. For example, by making the thicking of the Si film about 340 Å, the reflecting power of the surface of Cu base at the wavelength of 630 nm, the reflecting power becomes approximately zero.

EXAMPLE 11

The surface of Au was covered by the thin film of Si. The Au was vacuum deposited under the pressure $p \leq 2 \times 10^{-5}$ Torr. to have the thickness sufficient to avoid the light transmission, the reflecting power on the surface of Au becomes about 35-97%. The surface of Au base was covered by a Si film deposited under the pressure $p \leq 2 \times 10^{-5}$ Torr. to have a suitable thickness so as to reduce the reflection of the Au base. FIG. 13 shows the relation between the film thickness and the spectroscopic deflecting power in the visible region, the thickness being varied to have 0 Å, 80 Å, 140 Å and 320 Å, respectively. According to this method, by selecting a suitable thickness of Si film, the reflecting power becomes less 20%. If the thickness of the film is selected as 320 Å, the reflecting power of the Au surface is about 1% at the wavelength of 650 nm.

What is claimed is:

1. A coating having anti-reflection characteristics within a visible range, comprising:
   an aluminum layer vapor-deposited on a substrate to a film thickness preventing the transmission of light therethrough under a pressure of $2 \times 10^{-5}$ Torr. or below, and
   a silicon layer having a film thickness of the order of 300 Å vapor-deposited on said aluminum layer under a pressure of $2 \times 10^{-5}$ Torr. or below.

2. A coating having anti-reflection characteristics within a visible range, comprising:
   an aluminum layer vapor-deposited on a substrate to a film thickness preventing the transmission of light therethrough under a pressure of $2 \times 10^{-5}$ Torr. or below, and
   a chromium layer having a film thickness of the order of 320 Å vapor-deposited on said aluminum layer under a pressure of $2 \times 10^{-5}$ Torr. or less.

3. A coating having anti-reflection characteristics within a visible range, comprising:
   a silver layer vapor-deposited on a substrate to a film thickness preventing the transmission of light therethrough under a pressure of $2 \times 10^{-5}$ Torr. or below, and
   a silicon layer having a film thickness of the order of 220 Å vapor-deposited on said silver layer under a pressure of $2 \times 10^{-5}$ Torr. or below.

4. A coating having anti-reflection characteristics within a visible range, comprising:
   a silver layer vapor-deposited on a substrate to a film thickness preventing the transmission of light therethrough under a pressure of $2 \times 10^{-5}$ Torr. or below, and
   a chromium layer having a film thickness of the order of 220 Å vapor-deposited on said silver layer under a pressure of $2 \times 10^{-5}$ Torr. or below.

5. A coating having anti-reflection characteristics within a visible range, comprising:
   a chromium layer vapor-deposited on a substrate to a film thickness preventing the transmission of light therethrough under a pressure of $2\times 10^{-5}$ Torr. or below, and a silicon layer having a film thickness of the order of 360 Å vapor-deposited on said chromium layer under a pressure of $2\times 10^{-5}$ Torr. or below.

6. A coating having anti-reflection characteristics within a visible range, comprising:

a copper layer vapor-deposited on a substrate to a film thickness preventing the transmission of light therethrough under a pressure of $2\times 10^{-5}$ Torr. or below, and a silicon layer having a film thickness of the order of 200 Å vapor-deposited on said copper layer under a pressure of $2\times 10^{-5}$ Torr. or below.

7. A coating having anti-reflection characteristics within a visible range, comprising:

a gold layer vapor-deposited on a substrate to a film thickness preventing the transmission of light therethrough under a pressure of $2\times 10^{-5}$ Torr. or below, and a silicon layer having a film thickness of the order of 320 Å vapor-deposited on said gold layer under a pressure of $2\times 10^{-}$ Torr. or below.

* * * * *

UNITED STATES PATENT AND TRADEMARK OFFICE
CERTIFICATE OF CORRECTION

PATENT NO. : 4,294,890

DATED : October 13, 1981

INVENTOR(S) : SUSUMU ITO, ET AL.

Page 1 of 2

It is certified that error appears in the above—identified patent and that said Letters Patent is hereby corrected as shown below:

Column 3, line 18, after "base" insert --plate--.

Column 4, line 1, "condition" should be --conduction--.

Column 5, formula (8), the denominator "$1 + \vec{r}_1 - \vec{r}_2 \exp(-1\delta)$" should be --$1 + \vec{r}_1 \cdot \vec{r}_2 \exp(-1\delta)$--;

formula (9), line 21, "$R = \vec{r} - \vec{r} =$" should be --$R = \vec{r} \cdot \vec{r} =$--; line 22, the numerator beginning with "$r_1^2$" should be --$1^2$--; line, "80" should be --$\lambda$--;

formula (14), the initial fraction "$\frac{\delta}{2}$" should be --$\frac{\pi}{2}$--;

formula (17), "(2m + 1)" should be --$(2m + 1)\pi$--;

Column 6, formula (19), "$\left(\frac{4xk_1d_1}{2}\right)$" should be --$\left(\frac{4\pi k_1 d_1}{\lambda}\right)$-- formula (19), "$\frac{4xn_1d_1}{2} = (2m + 1)r$" should be --$\frac{4\pi n_1 d_1}{\lambda} = (2m + 1)\pi$--

UNITED STATES PATENT AND TRADEMARK OFFICE
CERTIFICATE OF CORRECTION

PATENT NO. : 4,294,890
DATED : October 13, 1981
INVENTOR(S) : SUSUMU ITO, ET AL.

It is certified that error appears in the above—identified patent and that said Letters Patent is hereby corrected as shown below:

Column 8, line 21, "178" should be --1/2--; line 47, after "that", insert --by--.
Column 12, line 12, "10-" should be --$10^{-5}$--.

Signed and Sealed this

Twelfth Day of January 1982

[SEAL]

Attest:

GERALD J. MOSSINGHOFF

*Attesting Officer*  *Commissioner of Patents and Trademarks*